US012669941B2

(12) United States Patent
M N et al.

(10) Patent No.: US 12,669,941 B2
(45) Date of Patent: Jun. 30, 2026

(54) METHOD FOR DETECTING TEMPERATURE IN A FLASH MEMORY DEVICE AND THE FLASH MEMORY DEVICE THEREOF

(71) Applicant: SAMSUNG ELECTRONICS CO., LTD., Suwon-si (KR)

(72) Inventors: Vinay Kumar M N, Bengaluru (IN); Akhilesh Kumar Jaiswal, Bengaluru (IN); Puneet Kukreja, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/408,784

(22) Filed: Jan. 10, 2024

(65) Prior Publication Data

US 2024/0329850 A1      Oct. 3, 2024

(30) Foreign Application Priority Data

Mar. 31, 2023    (IN) .............................. 202341025119

(51) Int. Cl.
*G06F 3/06* (2006.01)
*G06F 11/30* (2006.01)

(52) U.S. Cl.
CPC ............ *G06F 3/0616* (2013.01); *G06F 3/064* (2013.01); *G06F 3/0679* (2013.01); *G06F 11/3058* (2013.01)

(58) Field of Classification Search
CPC ...... G06F 3/0616; G06F 3/064; G06F 3/0679; G06F 11/3058; G06F 3/0653; G06F 11/3037
See application file for complete search history.

(56) References Cited

U.S. PATENT DOCUMENTS

| | | | |
|---|---|---|---|
| 9,760,311 B1 | 9/2017 | Amir et al. | |
| 10,340,023 B1 | 7/2019 | Peng et al. | |
| 2016/0117216 A1* | 4/2016 | Muchherla | .............. G06F 11/30 |
| | | | 714/6.11 |
| 2016/0320995 A1 | 11/2016 | Warriner | |
| 2016/0378149 A1 | 12/2016 | Kam et al. | |
| 2018/0286492 A1* | 10/2018 | Lee | ........................ G11C 29/44 |

FOREIGN PATENT DOCUMENTS

KR       20180110708 A   *  3/2017

* cited by examiner

*Primary Examiner* — Hosain T Alam
*Assistant Examiner* — Subir Kumar Chowdhury
(74) *Attorney, Agent, or Firm* — Morgan, Lewis & Bockius LLP

(57) ABSTRACT

The present disclosure provides a method and a flash memory device for detecting temperature in the flash memory device. The method includes receiving an Input/Output (I/O) request from a host device and determining on-cell count value for a targeted page within an active block of the flash memory device upon receiving the I/O request. The method further includes comparing the on-cell count value of the targeted page, which is within the active block of the flash memory device, with a stored on-cell count data of the flash memory device. Additionally, the method includes determining the temperature of the flash memory device corresponding to a stored on-cell count value based on the comparison. A notification signal is transmitted to the host device based on the temperature of the flash memory device and a threshold operating temperature of the flash memory device.

20 Claims, 5 Drawing Sheets

FIG. 3A

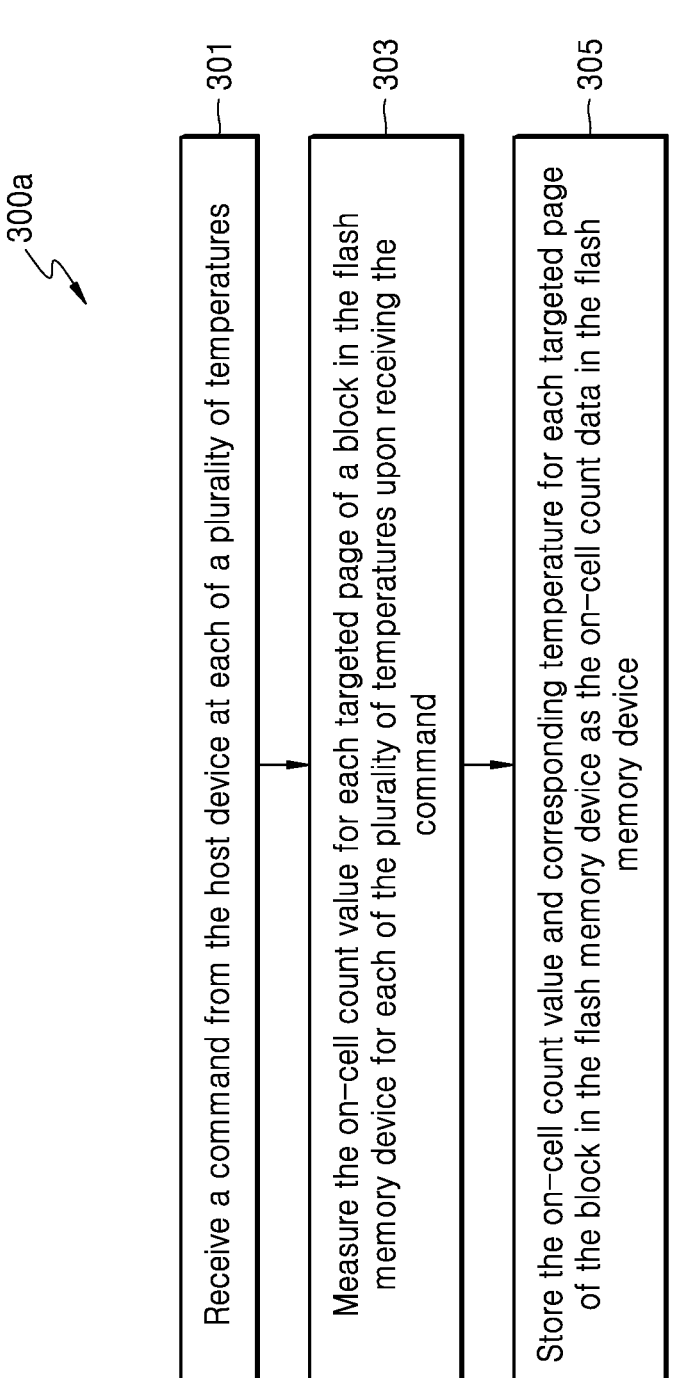

300a

Receive a command from the host device at each of a plurality of temperatures — 301

Measure the on-cell count value for each targeted page of a block in the flash memory device for each of the plurality of temperatures upon receiving the command — 303

Store the on-cell count value and corresponding temperature for each targeted page of the block in the flash memory device as the on-cell count data in the flash memory device — 305

Figure 3B:
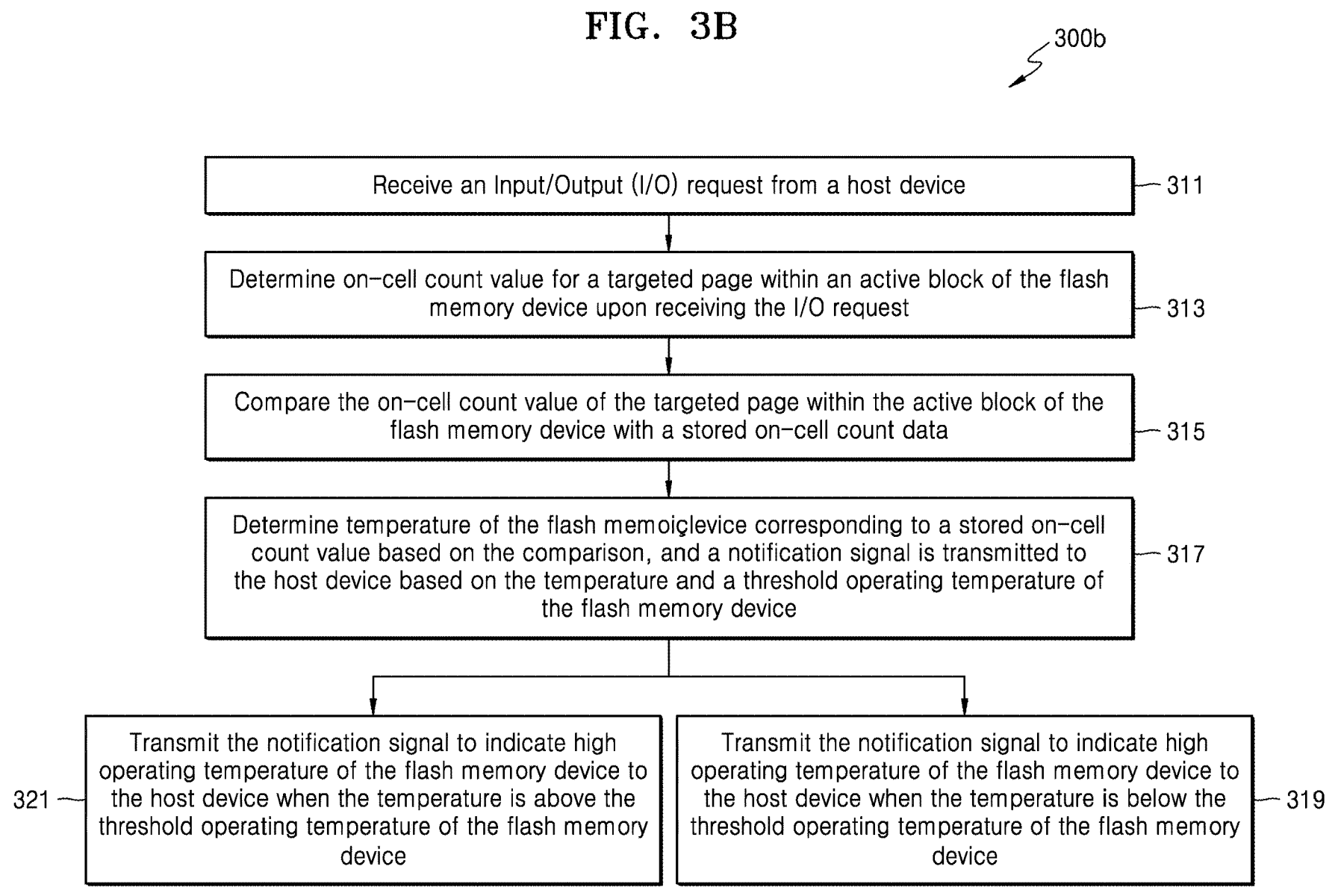

Receive an Input/Output (I/O) request from a host device	311

Determine on-cell count value for a targeted page within an active block of the flash memory device upon receiving the I/O request	313

Compare the on-cell count value of the targeted page within the active block of the flash memory device with a stored on-cell count data	315

Determine temperature of the flash memory device corresponding to a stored on-cell count value based on the comparison, and a notification signal is transmitted to the host device based on the temperature and a threshold operating temperature of the flash memory device	317

Transmit the notification signal to indicate high operating temperature of the flash memory device to the host device when the temperature is above the threshold operating temperature of the flash memory device	321

Transmit the notification signal to indicate high operating temperature of the flash memory device to the host device when the temperature is below the threshold operating temperature of the flash memory device	319

FIG. 4

METHOD FOR DETECTING TEMPERATURE IN A FLASH MEMORY DEVICE AND THE FLASH MEMORY DEVICE THEREOF

CROSS-REFERENCE TO RELATED APPLICATION

This application claims priority under 35 U.S.C. § 119 to Indian Patent Application No. 202341025119, filed on Mar. 31, 2023, the disclosure of which is incorporated by reference herein in its entirety.

TECHNICAL FIELD

The present inventive concept relates to the field of storage devices, and more particularly, to a flash memory device and a method for detecting temperature in the flash memory device.

DISCUSSION OF THE RELATED ART

In storage devices, high performance often leads to higher power usage and, consequently, an increased generation of heat. If the generated heat is not reduced, storage device temperature might exceed threshold operating condition/temperature and lead to damage of the storage device (e.g., hardware damage). Temperature detection and notification transmission to a host device might help the host device to take appropriate action to lower the storage device temperature to the threshold operating condition/temperature. Traditionally, in some storage devices such as flash memory devices, the temperature detection is performed using thermal sensors. However, the use of thermal sensors increases the cost of the flash memory devices. Further, in low-cost flash memory devices where the thermal sensors are not included or not implemented, a technique for implementing an existing thermal sensor to detect flash memory device temperature may be impractical due to increased cost.

SUMMARY

According to an embodiment of the present inventive concept, a method of detecting temperature in a flash memory device includes: receiving an Input/Output (I/O) request from a host device; determining on-cell count value for a targeted page within an active block of the flash memory device upon receiving the I/O request; comparing the on-cell count value of the targeted page, which is within the active block of the flash memory device, with a stored on-cell count data of a pre-defined on-cell count table; and determining the temperature of the flash memory device corresponding to a stored on-cell count value based on the comparison, wherein a notification signal is transmitted to the host device, based on the temperature of the flash memory device and a threshold operating temperature of the flash memory device.

According to an embodiment of the present inventive concept, a flash memory device for detecting temperature in the flash memory device includes: a memory; a communication interface for communicating with a host device; and a processor configured to: receive an Input/Output (I/O) request from the host device through the communication interface; determine on-cell count value for a targeted page within an active block of the flash memory device upon receiving the I/O request; compare the on-cell count value of the targeted page, which is within the active block of the flash memory device, with a stored on-cell count data of a pre-defined on-cell count table; and determine the temperature of the flash memory device corresponding to a stored on-cell count value based on the comparison, wherein a notification signal is transmitted to the host device, based on the temperature of the flash memory device and a threshold operating temperature of the flash memory device.

According to an embodiment of the present inventive concept, a flash memory device for detecting temperature in the flash memory device includes: a memory including data stored therein and a plurality of modules; an Input/Output (I/O) interface for communicating with a host device; and a processor communicatively coupled to the plurality of modules, wherein the plurality of modules includes a transceiver module, a determining module, and a comparing module, wherein the transceiver module is configured to receive a command from the host device, wherein the determining module is configured to: measure an on-cell count value for each targeted page of a block in the flash memory device for each of a plurality of temperatures upon receiving the command from the host device; store the on-cell count value and corresponding temperature for each targeted page of the block in the flash memory device as on-cell count data in the flash memory device; determine the on-cell count value for a targeted page within an active block of the flash memory device; and determine the temperature of the flash memory device corresponding to the stored on-cell count value based on a comparison between the on-cell count value of the targeted page, which is within the active block of the flash memory device, and the stored on-cell count data.

BRIEF DESCRIPTION OF THE DRAWINGS

The above and other aspects of the present inventive concept will become more apparent by describing in detail embodiments thereof, with reference to the accompanying drawings, in which:

FIG. 3a illustrates a flowchart showing a method of storing on-cell count data in a flash memory device in accordance with an embodiment of the present inventive concept.

FIG. 3b illustrates a flowchart showing a method of detecting temperature in a flash memory device in accordance with an embodiment of the present inventive concept.

FIG. 4 illustrates a block diagram of a host storage system according in accordance with an embodiment of the present inventive concept.

Figure 1:
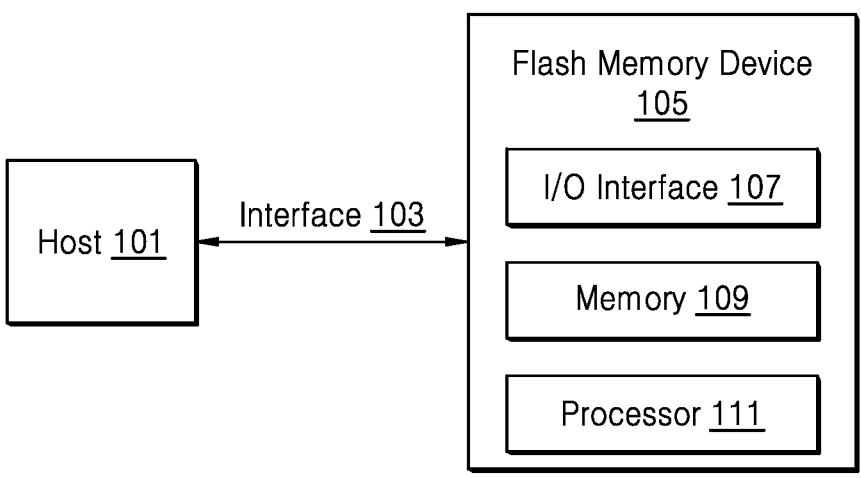
FIG. 1 illustrates for a system for detecting temperature in a flash memory device in accordance with an embodiment of the present inventive concept.

It should be appreciated by those skilled in the art that any block diagrams herein represent conceptual views of illustrative systems embodying the principles of the present inventive concept. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION OF THE EMBODIMENTS

In the present document, the word "exemplary" is used herein to mean "serving as an example, instance, or illustration." Any embodiment or implementation of the present inventive concept described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to include all modifications, equivalents, and alternatives falling within the spirit and scope of the present inventive concept.

In the following detailed description of the embodiments of the present inventive concept, reference is made to the accompanying drawings to describe the present inventive concept. These embodiments are described in sufficient detail to enable those skilled in the art to practice the present inventive concept, and it is to be understood that other embodiments may be utilized and that changes may be made without departing from the spirit and scope of the present inventive concept. The following description is, therefore, not to be taken in a limiting sense.

Embodiments of the present inventive concept provide a method and a flash memory device for detecting temperature in a flash memory device. In the present disclosure, an on-cell count data comprising of on-cell count value and corresponding temperature for targeted page of a block in the flash memory is measured for all polarity and stored in the flash memory device as a pre-defined on-cell count table. When an Input/Output (I/O) request from a host device is received, on-cell count value for a targeted page within an active block of the flash memory device is determined and compared with the stored on-cell count data. Based on the comparison, the temperature of the flash memory device corresponding to a stored on-cell count value is determined. Thereafter, a notification signal is transmitted to the host device based on the temperature and a threshold operating temperature of the flash memory device. The present disclosure provides a cost-effective solution to determine flash memory device temperature without use of any temperature/thermal sensor. Further, the present inventive concept allows implementing dynamic thermal throttling in flash memory devices that does not support any temperature/thermal sensor. Furthermore, the present inventive concept helps a flash memory device to operate within the specified temperature range, thereby, avoiding data corruption in the flash memory device and consequently, increasing the lifetime of the flash memory device. Additionally, the present inventive concept helps to determine when the flash memory device is operating at a low or at a high temperature and allows the host device to take appropriate action at appropriate time to reduce temperature without shutting down the flash memory device.

FIG. 1 illustrates a system for detecting temperature in a flash memory device in accordance with an embodiment of the present inventive concept.

In the FIG. 1, the system includes a host device (also, referred as a host) 101, an interface 103 and a flash memory device 105. The host device 101 can be a computer, a laptop, a mobile device, an embedded device, or any computing device. The host device 101 is connected to the flash memory device 105 via the interface 103. The interface 105 may be a wired communication. In an embodiment of the present inventive concept, the host device 101 may communicate with the flash memory device 105 wirelessly.

In the embodiment of the present inventive concept, the flash memory device 105 is a NAND based device. The NAND based device is one of embedded MultiMediaCard (eMMC), Secure Digital (SD) card, Universal Flash Storage (UFS), and Solid-State Drive (SSD). The flash memory device 105 includes an Input/Output (I/O) interface 107 (e.g., a communication interface), a memory 109, and a processor (or, e.g., a controller) 111. For example, the flash memory device 105 may include a controller. The I/O interface 107 is configured to receive an I/O request from the host device 101 and receive a command from the host device 101 at each of a plurality of temperatures prior to receiving the I/O request from the host device 101. The I/O request is a data write request or a data read request. The I/O interface 107 employs a wired communication protocol/method.

The memory 109 is communicatively coupled to the processor 111 of the flash memory device 105. The memory 109, also, stores controller-executable instructions which may cause the processor 111 to execute the instructions for detecting temperature in the flash memory device 105. The memory 109 includes, without limitation, memory drives, removable disc drives, etc.

The processor 111 includes at least one data processor for detecting temperature in the flash memory device 105. The processor 111 may include specialized processing units such as integrated system (bus) controllers, memory management control units, floating point units, graphics processing units, digital signal processing units, etc.

Hereinafter, the operation for detecting temperature in the flash memory device 105 is explained briefly in two parts. First part explains a method of storing on-cell count data in the flash memory device 105, and second part explains a method of detecting temperature in the flash memory device 105. The first part explaining the method of storing on-cell count data in the flash memory device 105 is performed once for the flash memory device 105, whereas the second part explaining the method of detecting temperature in the flash memory device 105 is performed as and when the flash memory device 105 receives an I/O request from the host device 101.

First part: prior to receiving the I/O request from the host device 101, the flash memory device 105 receives a write command from the host device 101. Subsequently, the data is received from the host device 101 by the flash memory device 105 at a plurality of temperatures. For example, the plurality of temperatures includes temperatures ranging from, but not limited to, about −40° C. to about 160° C. In present inventive concept, the flash memory device 105 is exposed to the plurality of temperatures using a temperature inducing/forcing equipment. Thereafter, the flash memory device 105 measures/reads an on-cell count value for each targeted page of a block in the flash memory device 105 for the plurality of temperatures. The on-cell count value refers to number of cells which are programmed to a particular voltage range. For example, if there are 100 total cells, and 20 cells out of 100 total cells are programmed to a voltage level of about 3V, then 20 cells will be the on-cell count value at the voltage level of about 3V. A targeted page refers to a page within a block in the flash memory device 105 that is to be checked for the on-cell count value. The targeted page or targeted pages among pages within the block in the flash memory device 105 are set by the manufacturer of the flash memory device 105. Thereafter, the flash memory device 105 stores the on-cell count value and corresponding temperature for each targeted page of the block in the flash memory device 105 as the on-cell count data in a pre-defined on-cell count table in the flash memory device 105. For instance, when the flash memory device 105 receives the command from the host device 101, the flash memory device 105 measures the on-cell count value for each targeted page of the block in the flash memory device 105 at each of the plurality of temperatures. Thereafter, the flash memory device 105 stores the on-cell count value and corresponding temperature, for each targeted page of the block in the flash memory device 105 as the on-cell count data in a pre-defined on-cell count table. Analogously, the process of measuring and storing the on-cell count value for each targeted page at the plurality of (or different) temperatures is performed. The on-cell count value and corresponding temperature is stored as the on-cell count data in the pre-defined on-cell count table in the flash memory device 105 as a part of the flash memory device 105 firmware. In one embodiment of the present inventive concept, the on-cell count data is stored in a tabular format (also, referred as On-cell Count Table or OCT) as shown in Table 1 below. The on-cell count data in the Table 1 is presented as an example and should not be construed as an exhaustive data.

TABLE 1

| Temperature in ° C. | On-cell count value |
| --- | --- |
| 25 | 111111 |
| 85 | 222222 |
| 125 | 333333 |
| 140 | 444444 |
| 160 | 555555 |
| −25 | 666666 |
| −40 | 777777 |

The stored on-cell count data remains in the flash memory device 105 for an entire flash memory device life cycle. Once the on-cell count data is stored in the flash memory device 105 as mentioned above, the flash memory device 105 is ready for the second part of the operation, i.e., detecting temperature in the flash memory device 105.

The plurality of the temperatures and on-cell count values mentioned above are presented for sake of explanation and as an example. However, in practice, the plurality of the temperatures and on-cell count values may vary based on type of flash memory devices.

During operation of the flash memory device 105, the flash memory device 105 receives an I/O request from the host device 101. In an embodiment of the present inventive concept, the processor 111 may receive the I/O request from the host device 101 through the I/O interface 107. The I/O request is a data write request or a data read request. Upon receiving the I/O request, the flash memory device 105 determines on-cell count value for a targeted page within an active block in the flash memory device 105. For example, the processor 111 may determine the on-cell count value for a targeted page within an active block in the flash memory device 105. The targeted page refers to a page among a plurality of pages within a block in the flash memory device 105 that is to be checked for the on-cell count value. The active block refers to a block in the flash memory device 105, which executes the I/O request. Thereafter, the flash memory device 105 (e.g., the processor 111) compares the on-cell count value of the targeted page within the active block of the flash memory device 105 with the stored on-cell count data. Based on the comparison, the flash memory device 105 determines the temperature of the flash memory device 105 corresponding to a stored on-cell count value. The flash memory device 105 transmits a notification signal to the host device 101 based on the temperature and a threshold operating temperature of the flash memory device 105. For example, when the temperature is above the threshold operating temperature of the flash memory device 105, the flash memory device 105 transmits the notification signal, which indicates that the flash memory device 105 is operating at a high temperature, to the host device 101. When the temperature is below the threshold operating temperature of the flash memory device 105, the flash memory device 105 transmits the notification signal, which indicates that the flash memory device 105 is operating at a low temperature, to the host device 101. The threshold operating temperature of the flash memory device 105 is set by the manufacturer of the flash memory device 105. Thereafter, based on the notification signal, the host device 101 takes appropriate action to optimize performance and functionality of the flash memory device 105.

Figure 2:
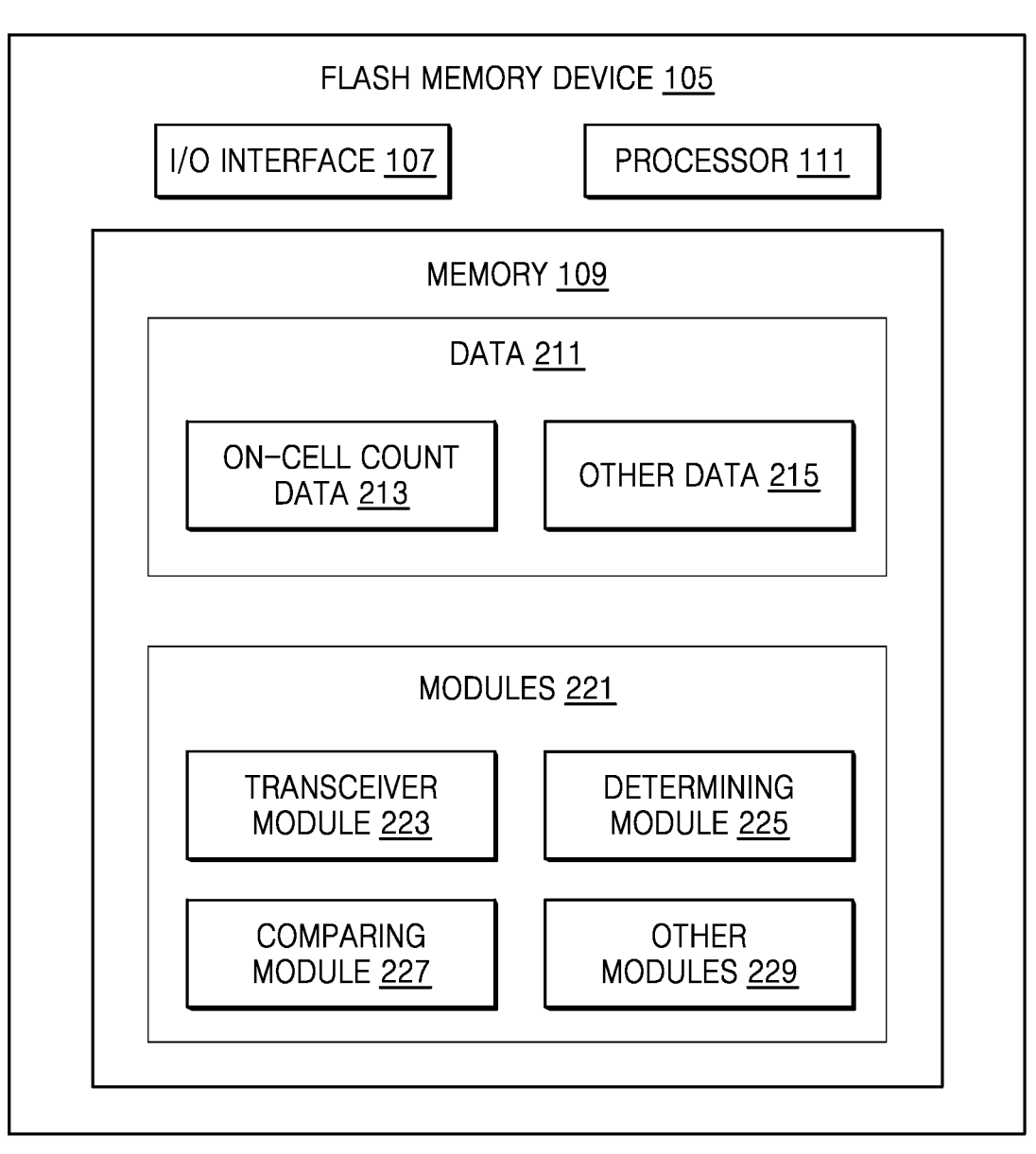
FIG. 2 shows a block diagram of a flash memory device in accordance with an embodiment of the present inventive concept.

FIG. 2 shows a detailed block diagram of a flash memory device in accordance with an embodiment of the present inventive concept.

The flash memory device 105, in addition to the I/O interface 107 and processor 111 described above, includes data 211 and one or more modules 221, which are described herein in detail. In the present embodiment, the data 211 may be stored within the memory 109. The data 211 include, for example, on-cell count data 213 and other data 215.

The on-cell count data 213 includes on-cell count values and corresponding temperature. The on-cell count values and corresponding temperature are together referred as on-cell count data. In one embodiment of the present inventive concept, the on-cell count data is stored in a tabular format (also, referred as On-cell Count Table or OCT) as shown in Table 1 above.

The other data 215 stores data, including meta data, user data, and temporary files, generated by one or more modules 221 for performing the various functions of the flash memory device 105.

In the embodiment of the present inventive concept, the data 211 in the memory 109 are processed by the one or more modules 221 present within the memory 109 of the flash memory device 105. In the embodiment, the one or more modules 221 are implemented as dedicated hardware units (e.g., circuits). As used herein, the term module refers to, for example, an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. In an embodiment of the present inventive concept, the one or more modules 221 are communicatively coupled to the processor 111 for performing one or more functions of the flash memory device 105. The said modules 221 when configured with the functionality defined in the present disclosure results in a novel hardware. In an embodiment of the present inventive concept, the processor 111 or controller may include the modules 221, or another processor or controller may include the modules 221.

In one implementation, the one or more modules 221 include, but are not limited to, a transceiver module 223, a determining module 225, and a comparing module 227. The one or more modules 221, also, includes other modules 229 to perform various miscellaneous functionalities of the flash memory device 105.

Regarding the transceiver module 223, prior to receiving an I/O request from the host device 101, the transceiver module 223 receives a command from the host device 101 at each of a plurality of temperatures. The transceiver module 223 receives the Input/Output (I/O) request from the host device 101. The transceiver module 223 transmits a notification signal to the host device 101 based on a temperature and a threshold operating temperature of the flash memory device 105. For example, the transceiver module 223 transmits the notification signal to indicate low operating temperature of the flash memory device 105 to the host device 101 when the temperature of the flash memory device 105 is below the threshold operating temperature of the flash memory device 105. The transceiver module 223 transmits the notification signal to indicate high operating temperature of the flash memory device 105 to the host device 101 when the temperature of the flash memory device 105 is above the threshold operating temperature of the flash memory device 105.

Regarding the determining module 225, the determining module 225 measures the on-cell count value for each targeted page of a block in the flash memory device 105 for each of the plurality of temperatures upon receiving the command from the host device 101. Thereafter, the determining module 225 stores the on-cell count value and corresponding temperature for each targeted page of the block in the flash memory device 105 as the on-cell count data in the flash memory device 105. The determining module 225 determines on-cell count value for the targeted page within an active block of the flash memory device 105 upon receiving the I/O request from the host device 101. The determining module 225 determines the temperature of the flash memory device 105 corresponding to a stored on-cell count value based on the comparison performed by the comparing module 227. In one embodiment of the present inventive concept, the determining module 225 generates the notification signal that is to be transmitted to the host device 101 by the transceiver module 223 based on the temperature and a threshold operating temperature of the flash memory device 105.

Regarding the comparing module, 227, the comparing module 227 compares the on-cell count value of the targeted page within the active block of the flash memory device 105 with a stored on-cell count data in a pre-defined on-cell count table.

FIG. 3*a* illustrates a flowchart showing a method of storing on-cell count data in a flash memory device in accordance with an embodiment of the present inventive concept.

As illustrated in FIG. 3*a*, the method 300*a* includes one or more blocks for storing on-cell count data in a flash memory device in accordance with the present embodiment. The method 300*a* may be described in the general context of computer executable instructions. Generally, computer executable instructions can include routines, programs, objects, components, data structures, procedures, modules, and functions, which perform particular functions or implement particular abstract data types.

The order in which the method 300*a* is described is not intended to be construed as a limitation, and any number of the described method blocks can be combined in any order to implement the method. Additionally, individual blocks may be deleted from the methods without departing from the spirit and scope of the present inventive concept described herein. Furthermore, the method can be implemented in any suitable hardware, software, firmware, or combination thereof.

The following operations from the block 301 to the block 305 are performed prior to receiving an I/O request from the host device 101. The following operations are performed once after manufacturing of the flash memory device 105. Once the on-cell count data is stored in the flash memory device 105, the on-cell count data remains in the flash memory device 105 for an entire flash memory device life cycle.

At block 301, the transceiver module 223 of the flash memory device 105 may receive a command from a host device 101 at each of a plurality of temperatures.

At block 303, the determining module 225 of the flash memory device 105 may measure/determine an on-cell count value for each targeted page of a block in the flash memory device 105 for each of the plurality of temperatures upon receiving the command. The targeted page may refer to a page within a block in the flash memory device 105 that is to be checked for the on-cell count value.

At block 305, the determining module 225 of the flash memory device 105 may store the on-cell count value and corresponding temperature for each targeted page of the block in the flash memory device 105 as the on-cell count data in the flash memory device 105.

FIG. 3*b* illustrates a flowchart showing a method of detecting temperature in a flash memory device in accordance with an embodiment of the present inventive concept.

As illustrated in FIG. 3*b*, the method 300*b* includes one or more blocks for detecting temperature in a flash memory device in accordance with the present embodiment. The method 300*b* may be described in the general context of computer executable instructions. Generally, computer executable instructions can include routines, programs, objects, components, data structures, procedures, modules, and functions, which perform particular functions or implement particular abstract data types.

The order in which the method 300*b* is described is not intended to be construed as a limitation, and any number of the described method blocks can be combined in any order to implement the method. Additionally, individual blocks may be deleted from the methods without departing from the spirit and scope of the present inventive concept described herein. Furthermore, the method can be implemented in any suitable hardware, software, firmware, or combination thereof.

At block 311, the transceiver module 223 of the flash memory device 105 may receive an Input/Output (I/O)) request from the host device 101. The I/O request may be a data write request or a data read request.

At block 313, the determining module 225 of the flash memory device 105 may determine on-cell count value for a targeted page within an active block of the flash memory device 105 upon receiving the I/O request. The targeted page may refer to a page within a block in the flash memory device 105 that is to be checked for the on-cell count value. The active block may refer to a block in the flash memory device 105 which executes the I/O request.

At block 315, the comparing module 227 of the flash memory device 105 may compare the on-cell count value of the targeted page, which is within the active block of the flash memory device, with a stored on-cell count data in a pre-defined on-cell count table. The stored on-cell count data may be in the flash memory device 105.

At block 317, the determining module 225 of the flash memory device 105 may determine the temperature of the flash memory device 105 corresponding to a stored on-cell count value based on the comparison. A notification signal may be transmitted to the host device 101 based on the temperature of the flash memory device 105 and a threshold operating temperature of the flash memory device 105.

At block 319, the transceiver module 223 of the flash memory device 105 may transmit the notification signal, which indicates low operating temperature of the flash memory device 105, to the host device 101 when the temperature of the flash memory device 105 is below the threshold operating temperature of the flash memory device 105.

At block 321, the transceiver module 223 of the flash memory device 105 may transmit the notification signal, which indicates high operating temperature of the flash memory device 105, to the host device 101 when the temperature of the flash memory device 105 is above the threshold operating temperature of the flash memory device 105.

Accordingly, the present inventive concept may provide a cost-effective method to determine flash memory device temperature without use of any temperature/thermal sensor.

The present inventive concept may allow implementing dynamic thermal throttling in flash memory devices that do not support or include any temperature/thermal sensor.

The present inventive concept may help a flash memory device operate within the specified temperature range, thereby, avoiding data corruption in the flash memory device and consequently, increasing the lifetime of the flash memory device.

The present inventive concept may help determine when the flash memory device is operating at a low or at a high temperature and allows the host device to take appropriate action at an appropriate time to reduce a temperature of the flash memory device without shutting down the flash memory device.

Figure 4:
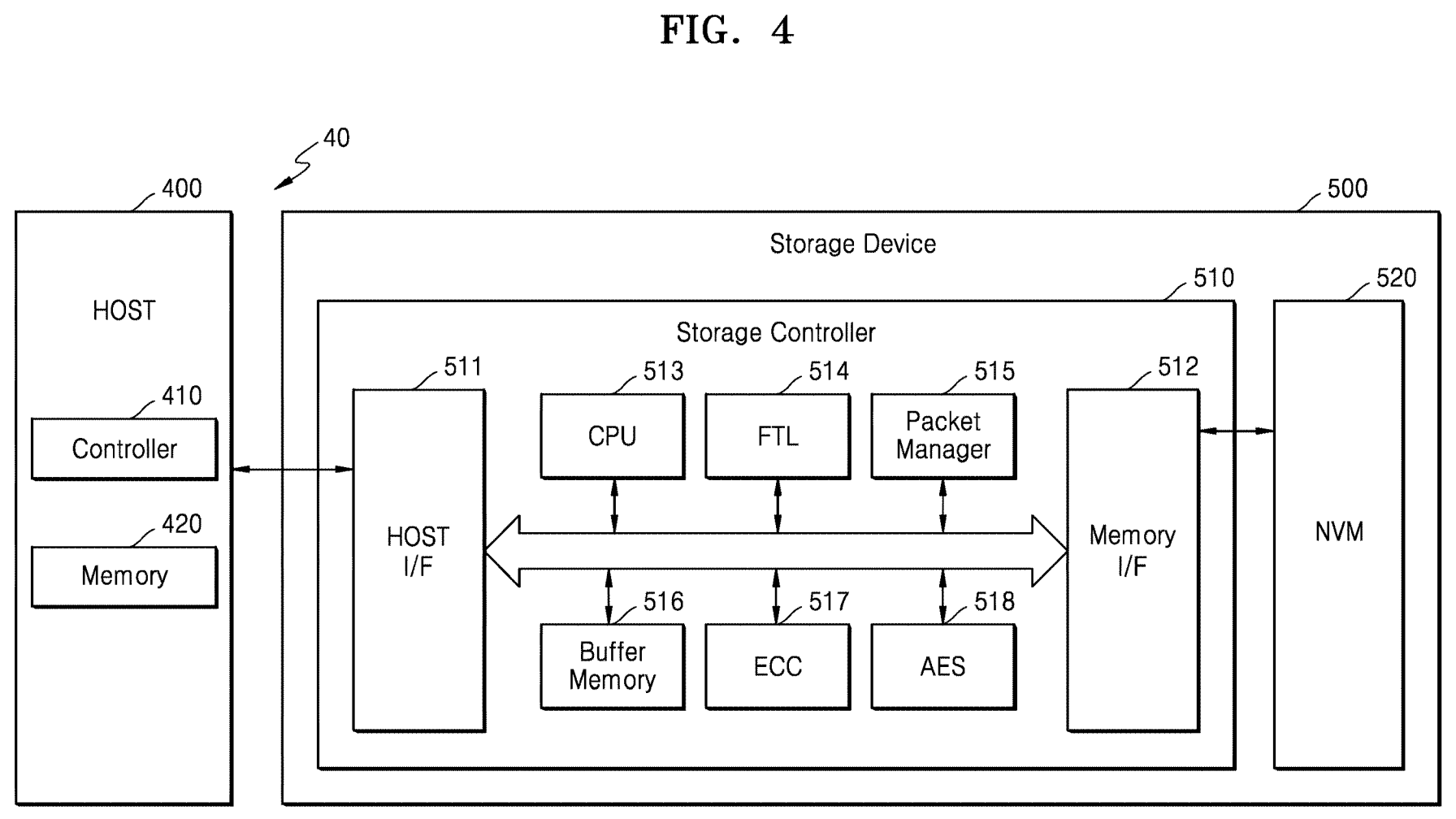

FIG. 4 illustrates a block diagram of a host storage system in accordance with an embodiment of the present inventive concept.

The host storage system 40 may include a host 400 and a storage device 500. Further, the storage device 500 may include a storage controller 510 and an NVM 520. According to an example embodiment of the present inventive concept, the host 400 may include a host controller 410 and a host memory 420. The host memory 420 may serve as a buffer memory configured to temporarily store data that is to be transmitted to the storage device 400 or store data received from the storage device 500.

The storage device 500 may include storage media configured to store data in response to requests from the host 400. As an example, the storage device 500 may include at least one of an SSD, an embedded memory, and a removable external memory. When the storage device 500 is an SSD, the storage device 500 may be a device that conforms to an NVMe standard. When the storage device 500 is an embedded memory or an external memory, the storage device 500 may be a device that conforms to a UFS standard or an eMMC standard. Each of the host 400 and the storage device 500 may generate a packet according to an adopted standard protocol and transmit the packet.

For example, when the NVM 520 of the storage device 500 includes a flash memory, the flash memory may include a 2D NAND memory array or a 3D (or vertical) NAND (VNAND) memory array. As another example, the storage device 500 may include various other kinds of NVMs. For example, the storage device 500 may include a magnetic RAM (MRAM), a spin-transfer torque MRAM, a conductive bridging RAM (CBRAM), a ferroelectric RAM (FRAM), a PRAM, a RRAM, and various other kinds of memories.

According to an embodiment of the present inventive concept, the host controller 410 and the host memory 420 may be implemented as separate semiconductor chips. In addition, in an embodiment of the present inventive concept, the host controller 410 and the host memory 420 may be integrated in the same semiconductor chip. As an example, the host controller 410 may be any one of a plurality of modules included in an application processor (AP). The AP may be implemented as a System on Chip (SoC). Further, the host memory 420 may be an embedded memory included in the AP or an NVM or memory module located outside the AP.

The host controller 410 may manage an operation of storing data (e.g., write data) of a buffer region of the host memory 420 in the NVM 520 and/or an operation of storing data (e.g., read data) of the NVM 520 in the buffer region.

The storage controller 510 may include a host interface 511, a memory interface 512, and a CPU 513. Further, the storage controller 510 may further include a flash translation layer (FTL) 514, a packet manager 515, a buffer memory 516, an error correction code (ECC) engine 517, and an advanced encryption standard (AES) engine 518. The storage controller 510 may further include a working memory in which the FTL 514 is loaded. The CPU 513 may execute the FTL 514 to control data write and read operations on the NVM 520.

The host interface 511 may transmit and receive packets to and from the host 400. A packet transmitted from the host 400 to the host interface 511 may include a command or data that is to be written to the NVM 520. A packet transmitted from the host interface 511 to the host 400 may include a response to the command or data read from the NVM 520. The memory interface 512 may transmit data that is to be written to the NVM 520 or may receive data read from the NVM 520. The memory interface 512 may be configured to comply with a standard protocol, such as Toggle or open NAND flash interface (ONFI).

The FTL 514 may perform various functions, such as an address mapping operation, a wear-leveling operation, and a garbage collection operation. The address mapping operation may be an operation of converting a logical address received from the host 400 into a physical address used to actually store data in the NVM 520. The wear-leveling operation may be a technique for preventing excessive deterioration of a specific block by allowing blocks of the NVM 520 to be uniformly used. As an example, the wear-leveling operation may be implemented using a firmware technique that balances erase counts of physical blocks. The garbage collection operation may be a technique for ensuring usable capacity in the NVM 520 by erasing an existing block after copying valid data of the existing block to a new block.

The packet manager 515 may generate a packet according to a protocol of an interface, which consents to the host 400, or may parse various types of information from the packet received from the host 400. In addition, the buffer memory 516 may temporarily store data that is to be written to the NVM 520 or data that is to be read from the NVM 520. Although the buffer memory 516 may be a component included in the storage controllers 510, the buffer memory 516 may be outside of the storage controllers 510.

The ECC engine 517 may perform error detection and correction operations on read data that is read from the NVM 520. For example, the ECC engine 517 may generate parity bits for write data that is to be written to the NVM 520, and the generated parity bits may be stored in the NVM 520 together with write data. During the reading of data from the NVM 520, the ECC engine 517 may correct an error in the read data by using the parity bits read from the NVM 520 along with the read data, and the ECC engine 517 may output error-corrected read data.

The AES engine 518 may perform at least one of an encryption operation and/or a decryption operation on data input to the storage controllers 510 by using a symmetric-key algorithm.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. In addition, a variety of optional components are described to illustrate the wide variety of possible embodiments of the present inventive concept.

When a single device or article is described herein, it will be readily apparent to a person of ordinary skill in the art that more than one device/article (whether or not they cooperate) may be used in place of a single device/article. Similarly, where more than one device or article is described herein (whether or not they cooperate), it will be readily apparent to a person of ordinary skill in the art that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the present inventive concept need not include the device itself.

The illustrated operations of FIGS. 3a and 3b show certain events occurring in a certain order. In an embodiment of the present inventive concept, certain operations may be performed in a different order, modified or removed. Moreover, steps may be added to the above-described logic and may still conform to the described embodiments. Further, operations described herein may occur sequentially, or certain operations may be processed in parallel to each other. Yet further, operations may be performed by a single processing unit or by distributed processing units.

Finally, the language used in the specification has been principally selected for readability and instructional purposes, and it might not have been selected to delineate or circumscribe the inventive subject matter. It is therefore intended that the scope of the present inventive concept not be limited by this detailed description. Accordingly, the disclosure of the embodiments of the present inventive concept is intended to be illustrative, but not limiting, of the scope of the present inventive concept.

While the present inventive concept has been described with reference to embodiments thereof, it will be understood by those of ordinary skill in the art that various changes in form and details may be made thereto without departing from the spirit and scope of the present inventive concept.

What is claimed is:

1. A method for detecting temperature in a flash memory device, the method comprising:
   receiving an Input/Output (I/O) request from a host device;
   determining an on-cell count value for a targeted page within an active block of the flash memory device upon receiving the I/O request, the determining of the on-cell count value comprising:
   applying a read voltage to the targeted page; and counting a number of memory cells in the targeted page that are turned on in response to the read voltage;
   comparing the on-cell count value of the targeted page, with a stored on-cell count data of a pre-stored on-cell count table in the flash memory device; and
   determining the temperature of the flash memory device corresponding to the on-cell count value based on the comparison,
   wherein the pre-stored on-cell count table defines a relationship between the number of memory cells turned on in response to the read voltage and the temperature of the flash memory device, and
   wherein a notification signal is transmitted to the host device, based on the temperature of the flash memory device and a threshold operating temperature of the flash memory device.

2. The method of claim 1, wherein the I/O request is a data write request or a data read request.

3. The method of claim 1, wherein the stored on-cell count data is in the flash memory device.

4. The method of claim 1, wherein prior to receiving the I/O request from the host device, the method comprises:
   receiving a command from the host device at each of a plurality of temperatures;
   measuring the on-cell count value for each targeted page of a block in the flash memory device for each of the plurality of temperatures upon receiving the command; and
   storing the on-cell count value and corresponding temperature for each targeted page of the block in the flash memory device as the stored on-cell count data of the pre-stored on-cell count table in the flash memory device.

5. The method of claim 1, wherein transmission of the notification signal to the host device based on the temperature of the flash memory device and the threshold operating temperature of the flash memory device comprises:
   transmitting the notification signal indicating a high operating temperature of the flash memory device, to the host device when the temperature of the flash memory device is above the threshold operating temperature of the flash memory device; and
   transmitting the notification signal indicating a low operating temperature of the flash memory device, to the host device when the temperature of the flash memory device is below the threshold operating temperature of the flash memory device.

6. The method of claim 1, wherein the flash memory device is a NAND based device.

7. The method of claim 1, wherein the targeted page refers to a page within a block in the flash memory device that is to be checked for the on-cell count value.

8. The method of claim 1, wherein the active block refers to a block in the flash memory device associated with the I/O request.

9. A flash memory device for detecting temperature in the flash memory device, the flash memory device comprising:
   a memory;
   a communication interface for communicating with a host device; and
   a processor configured to:
   receive an Input/Output (I/O) request from the host device through the communication interface;
   determine an on-cell count value for a targeted page within an active block of the flash memory device upon receiving the I/O request, wherein the determining of the on-cell count value comprises:

applying a read voltage to the targeted page; and counting a number of memory cells in the targeted page that are turned on in response to the read voltage;

compare the on-cell count value of the targeted page with a stored on-cell count data of a pre-stored on-cell count table in the flash memory device; and determine the temperature of the flash memory device corresponding to the on-cell count value based on the comparison, wherein the pre-stored on-cell count table defines a relationship between the number of memory cells turned on in response to the read voltage and the temperature of the flash memory device, and wherein a notification signal is transmitted to the host device, based on the temperature of the flash memory device and a threshold operating temperature of the flash memory device.

10. The flash memory device of claim 9, wherein the I/O request is a data write request or a data read request.

11. The flash memory device of claim 9, wherein the stored on-cell count data is in the flash memory device.

12. The flash memory device of claim 9, wherein the processor is configured to:

receive a command from the host device at each of a plurality of temperatures;

measure the on-cell count value for each targeted page of a block in the flash memory device for each of the plurality of temperatures upon receiving the command; and store the on-cell count value and corresponding temperature for each targeted page of the block in the flash memory device as the stored on-cell count data of the pre-stored on-cell count table in the flash memory device.

13. The flash memory device of claim 9, wherein the processor is configured to:

transmit the notification signal indicating a high operating temperature of the flash memory device, to the host device based on the temperature of the flash memory device being above the threshold operating temperature of the flash memory device; and transmit the notification signal indicating a low operating temperature of the flash memory device, to the host device based on the temperature of the flash memory device being below the threshold operating temperature of the flash memory device.

14. The flash memory device of claim 9, wherein the flash memory device is a NAND based device.

15. The flash memory device of claim 9, wherein the targeted page refers to a page within a block in the flash memory device that is to be checked for the on-cell count value.

16. The flash memory device of claim 9, wherein the active block refers to a block in the flash memory device associated with the I/O request.

17. A flash memory device for detecting temperature in the flash memory device, the flash memory device comprising:

a memory including data stored therein and a plurality of modules;

an Input/Output (I/O) interface for communicating with a host device; and a processor communicatively coupled to the plurality of modules, wherein the plurality of modules includes a transceiver module, a determining module, and a comparing module, wherein the transceiver module is configured to receive a command from the host device, wherein the determining module is configured to:

measure an on-cell count value for each targeted page of a block in the flash memory device for each of a plurality of temperatures upon receiving the command from the host device;

store the on-cell count value and corresponding temperature for each targeted page of the block in the flash memory device as stored on-cell count data of a pre-stored on-cell count table in the flash memory device;

determine the on-cell count value for a targeted page within an active block of the flash memory device, the determining of the on-cell count value comprising:

applying a read voltage to the targeted page; and counting a number of memory cells in the targeted page that are turned on in response to the read voltage; and determine the temperature of the flash memory device corresponding to the stored on-cell count value based on a comparison between the on-cell count value of the targeted page and the stored on-cell count data of the pre-stored on-cell count table in the flash memory device, wherein the pre-stored on-cell count table defines a relationship between the number of memory cells turned on in response to the read voltage and the temperature of the flash memory device, and wherein the determined temperature is directly from the pre-stored on-cell count table.

18. The flash memory device of claim 17, wherein the determining module is configured to generate a notification signal, which is to be transmitted to the host device, based on the temperature of the flash memory device and a threshold operating temperature of the flash memory device.

19. The flash memory device of claim 17, wherein the comparing module is configured to perform the comparison between the on-cell count value of the targeted page, which is within the active block of the flash memory device, and the stored on-cell count data.

20. The flash memory device of claim 17, wherein the on-cell count value for the targeted page, which is within the active block of the flash memory device, is determined in response to an I/O request from the host device.

\* \* \* \* \*